United States Patent
Wan et al.

(10) Patent No.: US 11,597,781 B2
(45) Date of Patent: Mar. 7, 2023

(54) PHOTOCURABLE COMPOSITION FOR MAKING LAYERS WITH HIGH ETCH RESISTANCE

(71) Applicant: CANON KABUSHIKI KAISHA, Tokyo (JP)

(72) Inventors: Fen Wan, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/136,920

(22) Filed: Dec. 29, 2020

(65) Prior Publication Data

US 2022/0204659 A1  Jun. 30, 2022

(51) Int. Cl.
| C08F 2/50 | (2006.01) |
| B32B 27/30 | (2006.01) |
| B32B 27/26 | (2006.01) |
| C08F 120/34 | (2006.01) |

(52) U.S. Cl.
CPC ............... C08F 2/50 (2013.01); B32B 27/26 (2013.01); B32B 27/308 (2013.01); C08F 120/34 (2013.01)

(58) Field of Classification Search
CPC .......... C08F 2/50; C08F 120/34; B32B 27/26; B32B 27/308
See application file for complete search history.

(56) References Cited

U.S. PATENT DOCUMENTS

| 8,530,540 B2 | 9/2013 | Kodama |
| 2014/0210140 A1 | 7/2014 | Omatsu |

FOREIGN PATENT DOCUMENTS

| EP | 3296368 A1 | | 3/2018 |
| JP | 2009191107 A | * | 8/2009 |
| JP | 2009191107 A | | 8/2009 |
| JP | 2009275195 A | | 11/2009 |
| JP | 5268384 B2 | | 8/2013 |
| JP | 5806903 B2 | | 11/2015 |
| WO | 3001294 A1 | | 1/2003 |
| WO | 2005086901 A2 | | 9/2005 |

OTHER PUBLICATIONS

Momose. et al.; "Effect of End Group Structures of Methacrylate Polymers on ArF Photoresist Performances", Proceedings of SPIE vol. 4345 (2001) © 2001, 8 pgs.

Otake, et al.; "Design and Development of Novel Monomers and copolymers for 193-nm Lithography", J. Photopolym. Sci. Technol., vol. 17, No. 4, 2004, 8 pgs.

Wei et al.; "Supported Co/activated carbon catalysts for the one-pot synthesis of isophorone diamine from hydroamination of isophorone nitrile", Reaction Kinetics, Mechanisms and Catalysis (2019) 127:931-943, 13 pgs.

Helbert, et al.; "Effect of Composition on Resist Dry-Etching Susceptibility", Polymer material for electronic applications, 1982, 12 pgs.

* cited by examiner

*Primary Examiner* — Sanza L. McClendon
(74) *Attorney, Agent, or Firm* — Abel Schillinger, LLP

(57) ABSTRACT

A photocurable composition can comprise a polymerizable material and a photoinitiator, wherein the polymerizable material can comprise at least one acrylate monomer including at least one cyano group (CN-acrylate monomer). The presence of a low amount of the CN-acrylate monomer between 10 wt % and not greater than 30 wt % can lower the contact angle of the composition and may improve the etch resistance of a photo-cured layer made from the photocurable composition.

17 Claims, No Drawings

PHOTOCURABLE COMPOSITION FOR MAKING LAYERS WITH HIGH ETCH RESISTANCE

FIELD OF THE DISCLOSURE

The present disclosure relates to a photocurable composition, particularly to a photocurable composition for nanoimprint lithography adapted for forming photo-cured layers having a high etch resistance.

BACKGROUND

Nanoimprint lithography is a useful method to manufacture nano-sized features onto a target substrate. In a first step, the pattern of a template is transferred to a cured imprint resist layer, and in a second step the pattern of the cured imprint resist layer is transferred into the underlying substrate. The second step is typically conducted by etching and called pattern transfer.

A good pattern transfer can be achieved if the etched layer is removed without damage to the resist pattern layer, which requires that the imprint resist has a high etch resistance. There exists a need to improve the etch resistance of cured imprint materials to form high precision patterns with low line edge roughness and low line width roughness. Next to a high etch resistance, an imprint resist composition needs to have a low viscosity, a suitable surface tension, and a low contact angle to the template and the underlying substrate.

SUMMARY

In one embodiment, a photocurable composition can comprise a photoinitiator and a polymerizable material, wherein the polymerizable material can comprise at least one acrylate monomer including at least one cyano group (CN-acrylate monomer); an amount of the CN-acrylate monomer can be at least 5 wt % and not greater than 30 wt % based on the total weight of the polymerizable material; and a contact angle of the photocurable composition to a $SiO_2$ surface may be not greater than 19.5 degrees.

In one aspect of the photocurable composition, the contact angle may be not greater than 15.0 degrees. In another aspect, the contact angle of the photocurable composition can be not greater than 10 degrees.

In another aspect of the photocurable composition, the CN-acrylate monomer can include the monomer of formula (1), with R1 being H or one ore more alkyl substitutions, and R2 being H or alkyl,

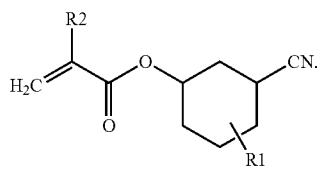

(1)

In a particular aspect, the CN-acrylate monomer of the polymerizable material can include the monomer of formula (2)

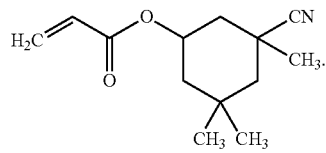

(2)

In another particular aspect of the photocurable composition, the CN-acrylate monomer may include 3-cyano benzyl acrylate or 3-cyano benzyl methacrylate.

In one aspect of the photocurable composition, the amount of the CN-acrylate monomer of the polymerizable material can be not greater than 20 wt % based on the total weight of the polymerizable material. In a further particular aspect, the amount of the CN-acrylate monomer may be not greater than 15 w % based on the total weight of the polymerizable material.

In another embodiment of the photocurable composition, the polymerizable material can further comprise at least one multi-functional acrylate monomer not including a cyano group. In one aspect the multi-functional acrylate monomer may be a bi-functional acrylate monomer. In a further aspect, an amount of the multi-functional acrylate monomer can be at least 10 wt % and not greater than 50 wt % based on the total weight of the polymerizable material.

In one particular aspect of the photocurable composition, the polymerizable material may comprises at least two further mono-functional acrylate monomers not including a cyano group.

In one embodiment, the viscosity of the photocurable composition can be not greater than 15 mPa·s at a temperature of 23° C.

In another embodiment, a laminate can comprise a substrate and a photo-cured layer overlying the substrate, wherein the photo-cured layer may be formed from the above-described photocurable composition.

In one embodiment, a method can comprise forming a photo-cured layer on a substrate, comprising: applying a layer of a photocurable composition on the substrate, the photocurable composition comprising a polymerizable material and a photoinitiator, wherein the polymerizable material can comprise at least one acrylate monomer including at least one cyano group (CN-acrylate monomer), an amount of the CN-acrylate monomer can be at least 5 wt % and not greater than 30 wt % based on the total weight of the polymerizable material, and a contact angle of the photocurable composition to a $SiO_2$ surface may be not greater than 19.5 degrees; bringing the photocurable composition into contact with a superstrate; irradiating the photocurable composition with light to form a photo-cured layer; and removing the superstrate from the photo-cured layer.

In one aspect of the method, the CN-acrylate monomer can include a CN acrylate monomer of formula (1), with R1 being one or more alkyl substitutions, and R2 being H or alkyl,

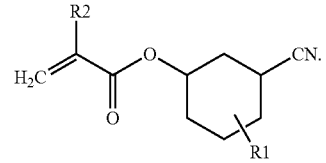

(1)

In another aspect of the method, a viscosity of the photocurable composition can be not greater than 15 mPa·s at a temperature of 23° C.

In a further aspect of the method, the polymerizable material of the photocurable composition can further comprise a bi-functional acrylate monomer in an amount of at least 10 wt % and not greater than 30 wt % based on the total weight of the polymerizable material.

In another embodiment, a method of manufacturing an article can comprise: applying a layer of a photocurable composition on a substrate, wherein the photocurable composition can comprise a polymerizable material and a photoinitiator, the polymerizable material can comprise at least one acrylate monomer including at least one cyano group (CN-acrylate monomer), an amount of the CN-acrylate monomer can be at least 5 wt % and not greater than 30 wt % based on the total weight of the polymerizable material, and a contact angle of the photocurable composition to a $SiO_2$ surface may be not greater than 19.5 degrees; bringing the photocurable composition into contact with a superstrate; irradiating the photocurable composition with light to form a photo-cured layer; removing the superstrate from the photo-cured layer; forming a pattern on the substrate; processing the substrate on which the pattern has been formed in the forming; and manufacturing an article from the substrate processed in the processing.

In one aspect of the method of manufacturing an article, the CN-acrylate monomer can include the monomer of formula (1), with R1 being H or one or more alkyl substitutions, and R2 being H or alkyl,

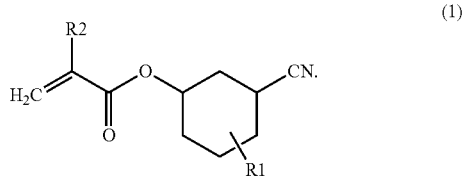

(1)

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it, is obvious that it is meant otherwise.

The present disclosure is directed to a photocurable composition comprising a photoinitiator and a polymerizable material, wherein the polymerizable material can comprise at least one acrylate monomer including at least one cyano group (CN-acrylate monomer), and an amount of the CN-acrylate monomer may be not greater than 30 wt %. It has been surprisingly observed that photocurable compositions including certain combinations of a selected CN-acrylate monomer with other polymerizable monomers can have a low contact angle and may form photo-cured layer having a high etch resistance.

In one aspect, the contact angle of the photocurable composition to a $SiO_2$ surface can be not greater than 19.5 degrees, such as not greater than 15.0 degrees, not greater than 12.0 degrees, not greater than 10.0 degrees, or not greater than 8.0 degrees.

In one embodiment, the CN-acrylate monomer can include the monomer of formula (1), with R1 being H or one or more alkyl substitutions, and R2 being H or alkyl. In a certain aspect, the R1 and R2 can be $C_1$ to $C_6$ alkyl. In a certain particular aspect, R1 can be one or more methyl or ethyl, and R2 can be H or methyl.

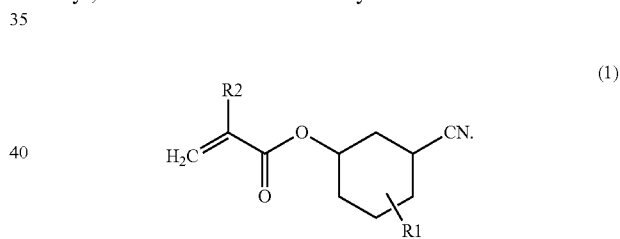

(1)

In a particular aspect, the CN-acrylate monomer can be the monomer of formula (2):

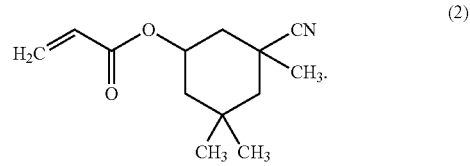 [SMILES: C=CC(=O)OC1CC(C)(C)CC(C)(C#N)C1]

(2)

In another particular aspect, the CN-acrylate monomer can be 3-cyano benzyl acrylate or 3-cyano benzyl methacrylate.

In one aspect, the amount of the CN-acrylate monomer can be not greater than 25 wt % based on the total weight of the polymerizable material, such as not greater than 20 wt %, or not greater than 15 wt %, or not greater than 12 wt %, or not greater than 10 wt %. In another aspect, the amount of CN-acrylate monomer can be at least 5 wt %, or at least 8 wt %, or at least 10 wt % based on the total weight of the polymerizable material. The amount of the CN-acrylate monomer can be a number between any of the minimum and maximum values noted above.

In a further aspect, the polymerizable material can further comprise at least one multi-functional acrylate monomer which does not include a cyano group. In one aspect, the multi-functional acrylate monomer of the polymerizable material can be a bi-functional acrylate monomer, a tri-functional acrylate monomer, a tetra-functional acrylate monomer, or any combination thereof. Non-limiting examples of multi-functional acrylate monomers can be bisphenol A dimethacrylate, neopentyl glycol diacrylate, trimethylolpropane triacrylate, tetramethylolmethane tetraacrylate, or any combination thereof. In a certain particular embodiment, the multi-functional acrylate monomer can be a bi-functional acrylate monomer including neopentyl glycol diacrylate.

The amount of the multi-functional acrylate monomer can be at least 10 wt %, or at least 15 wt %, or at least 20 wt %, or at least 25 wt % based on the total weight of the polymerizable material. In another aspect, the amount of the multi-functional acrylate monomer may be not greater than 50 wt % based on the total weight of the polymerizable material, such as not greater than 40 wt %, not greater than 30 wt %, not greater than 25 wt %, or not greater than 20 wt %. The amount of the multifunctional acrylate monomer can be a number within any of the minimum and maximum numbers noted above, such as from 10 wt % to 50 wt %, from 15 wt % to 40 wt %, or from 10 wt % to 30 wt %.

In yet a further aspect, a weight % ratio of the CN-acrylate monomer to the multi-functional acrylate monomer can be from 1:1 to 1:4, such as from 1:1 to 1:3, or from 1:1.5 to 1:2.5.

In another embodiment, the polymerizable material of the photocurable composition can include to a certain amount polymerizable monomers, oligomers, or polymers in addition to the CN-acrylate monomer and the at least one multi-functional acrylate monomer. Non-limiting examples of such polymerizable compounds can be, for example, benzyl acrylate (BA), 1-naphthyl acrylate, isobornyl-acrylate (IBOA), dihydrodicyclopentadienyl acrylate (DCPA), divinylbenzene (DVB), a maleimide monomer, a vinylether, or a styrene derivative.

In particular aspect, the photocurable composition can include at least one mono-functional acrylate monomer which does not contain a CN group in addition to the CN-acrylate monomer and the multi-functional acrylate monomer. In a certain particular aspect, the photocurable composition may include at least two mono-functional acrylate monomers not containing a CN group in addition to the CN-acrylate and the multi-functional acrylate monomer.

In a certain particular aspect, the photocurable composition of the present disclosure can comprise a CN-acrylate monomer in an amount not greater than 12 wt %, a multi-functional acrylate monomer, and at least two mono-functional acrylate monomers not containing a CN group.

In a further aspect, the curable composition of the present disclosure may be free of a solvent.

The amount of polymerizable material in the photocurable composition can be at least 75 wt % based on the total weight of the photocurable composition, such as at least 80 wt %, at least 85 wt %, at least 90 wt %, or at least 95 wt %. In another aspect, the amount of polymerizable material may be not greater than 99 wt %, such as not greater than 98 wt %, or not greater than 97 wt %, or not greater than 95 wt % based on the total weight of the photocurable composition. The amount of polymerizable material can be a value between any of the minimum and maximum values noted above. In a particular aspect, the amount of the polymerizable material can be at least 85 wt % and not greater than 98 wt %.

Important for the selection of monomers is the aspect of maintaining a low viscosity of the polymerizable composition before curing. In one embodiment, the viscosity of the curable composition can be not greater than 30 mPa·s, such as not greater than 25 mPa·s, not greater than 20 mPa·s, not greater than 15 mPa·s, or not greater than 10 mPa·s. In other certain embodiments, the viscosity may be at least 1 mPa·s, such as at least 3 mPa·s, such as at least 5 mPa·s, or at least 8 mPa·s. In a particularly preferred aspect, the photocurable composition can have a viscosity of not greater than 15 mPa·s. As used herein, all viscosity values relate to viscosities measured at a temperature of 23° C. with the Brookfield method using a Brookfield Viscometer.

In order to initiate the photocuring of the composition if exposed to light, one or more photoinitiators can be included in the photocurable composition. In one aspect, the amount of one or more photoinitiators can be between 1 wt % and 4 wt % based on the total weight of the photocurable composition.

In a certain aspect, the curing can be also conducted by a combination of light and heat curing.

The photocurable composition can further contain one or more optional additives. Non-limiting examples of optional additives can be stabilizers, dispersants, solvents, surfactants, inhibitors or any combination thereof. In a certain aspect, the amount of one or more surfactants can be between 0.3 wt % and 5 wt % based on the total weight of the photocurable composition.

In one embodiment, the photocurable composition can be applied on a substrate to form a photo-cured layer. As used herein, the combination of substrate and photo-cured layer overlying the substrate is called a laminate.

The present disclosure is further directed to a method of forming a photo-cured layer. The method can comprise applying a layer of the photocurable composition described above over a substrate, bringing the photocurable composition into contact with a template or superstrate; irradiating the photocurable composition with light to form a photo-cured layer; and removing the template or the superstrate from the photo-cured layer.

The substrate and the solidified layer may be subjected to additional processing, for example, an etching process, to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like.

The photo-cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly discovered that a certain combinations of polymerizable monomers containing a mono-functional acrylate monomer of formula (1) and at least one second monomer including a multi-functional acrylate monomer in a photocurable composition can have very suitable properties especially for IAP processing. The photocurable composition of the present disclosure can have a desired low viscosity of less than 15 mPa·s and low contact angle, and can form photo-cured layers having a high etch resistance.

EXAMPLES

The following non-limiting examples illustrate the concepts as described herein.

Example 1

Synthesis of 3-cyano-3,5,5-trimethylcyclohexyl acrylate (CN-TMCA)

In a first step, a mixture of 90 ml DMF, 100 g (0.669 mol) 3,5,5-trimethyl-2-cyclohexene-1-one (isophoron) and 27 g (0.404 mol) KCN was combined in a round bottom flask and heated up to 120° C. under stirring. To the heated mixture was added under continued stirring 5 ml of 6 molar $NH_4Cl$, and the temperature of the reaction mixture was maintained for four hours under stirring. Thereafter, the cyanated isophoron was separated from the reaction mixture by distillation under vacuum, and purified by recrystallization.

In a second step, the cyanated isophoron of step 1 was subjected to controlled hydrogenation of the C=O group by dissolving 100 g of the cyanated isophoron in n-heptane. The solution was transferred into a reactor and combined with 0.1 g of a $Cu/SiO_2$ catalyst under stirring and under hydrogen at a pressure of 1 atm. The fluid was heated in the reactor to 60° C. and maintained at 60° C. four one hour. Thereafter, the catalyst was separated by filtration and the solvent removed by applying vacuum. The remaining product was hydrated CN-isophoron (CN-isophonol), which was purified by recrystallization.

During a third step, the CN-isophonol was acrylated by dissolving 16.5 g (1.0 mol) of CN-isophonol in 150 ml dichloromethane mixed with 20.7 g $K_2CO_3$, placed in an ice bath, and a solution of 20.3 g acryloyl chloride in 50 ml $CH_3CN$ having a temperature of 0° C. was slowly dropped to the cooled CN-isophonol solution. After adding the acryloyl chloride, the temperature of the reaction mixture was maintained at 0° C., and then increased to room temperature (23° C.) and kept at this temperature for further 24 hours under stirring. The entire third step was conducted under nitrogen. The obtained acrylated. CN-isophonol was separated by filtering, washed and dried, and characterized via HNMR as 3-cyano-3,5,5-trimethylcyclohexyl acrylate (CN-TMCA of formula 2) with 98% purity.

Example 2

Synthesis of 3-cyanobenzyl acrylate (CN-BZA)

3-cyanobezyl acrylate (CN-BZA) was synthesized by direct acrylation of 3-cyanobenzyl alcohol (CN-BZO). The acrylation was conducted similarly as step 3 described in Example 1, except that 13.4 g (1 mol) of CN-BZO was used instead of CN-isophonol. The obtained CN-BZA was a light yellow oil. It was confirmed by H-NMR that the reaction product had the structure of CN-BZA and a purity of 95%.

Example 3

Preparing of Photocurable Compositions

A first photocurable compositions was prepared (Sample S1) containing 10 wt % of the monomer CN-TMCA made in Example 1, 20 wt % neopentyl glycol diacrylate (SR247 from Sartomer, PA, USA), 36 wt % isobornyl-acrylate (IBOA), 21 wt % dihydrodicyclopentadienyl acrylate (DCPA), and 14 wt % benzyl acrylate (BZA). Sample S1 further contained 3 wt % of photoinitiator (2 wt % Irgacure 651 and 1 wt % Irgacure 907 from BASF), and 4 wt % surfactants as release agents (2.7 wt % FS2000M1 and 1.4 wt % FS2000M2).

Furthermore, a comparative composition (C1) was prepared the same way as composition S1, except that it did not contain CN-TMCA, but, instead 10 wt % of the corresponding acrylate monomer not including a CN group, i.e., 3,5,5-trimethylcyclohexyl acrylate (TMCA), also called SR420 from Sartomer.

A second photocurable composition was prepared (Sample S2) containing 10 wt % CN-BZA, 14 wt % BZA, 20 wt % SR247, 36 wt % IBOA, and 21 wt % DCPA. Sample S2 further contained 3 wt % of photoinitiator (2 wt % Irgacure 651 and 1 wt % Irgacure 907 from BASF), and 4 wt % surfactants as release agents (2.7 wt % FS2000M1 and 1.4 wt % FS2000M2 from Wonda Science, MA, USA).

A second comparative composition (C2) was prepared being the same as composition S2, except that it did not contain. CN-BZA. The CN-BZA was replaced by BZA, such that the amount of BZA increased from 14 wt % to 24 wt %.

A summary of the polymerizable materials of compositions S1, C1, S2, and C2 can be seen in Table 1. All numbers relate to wt % based on the total weight of the polymerizable material.

TABLE 1

| Sample | CN-TMCA | CN-BZA | TMCA | BZA | SR247 | IBOA | DCPA |
|---|---|---|---|---|---|---|---|
| S1 | 10 | | | 14 | 20 | 36 | 21 |
| C1 | | | 10 | 14 | 20 | 36 | 21 |
| S2 | | 10 | | 14 | 20 | 36 | 21 |
| C2 | | | | 24 | 20 | 36 | 21 |

Example 4

Comparison of Viscosity, Contact Angle and Surface Tension

Table 2 provides a summary of tested properties of the photocurable compositions S1, C1, S2, and C2, such as viscosity, surface tension and contact angle.

TABLE 2

| Sample | Viscosity [mPa · s] | Surface Tension [mN/m] | Contact Angle [°] |
|---|---|---|---|
| S1 | 7.0 | 28.58 | 7.20 |
| C1 | 7.2 | 29.85 | 19.70 |
| S2 | 7.6 | 29.71 | 19.20 |
| C2 | 6.4 | 30.06 | 17.80 |

It can be seen that all four compositions had a similar low viscosity below 10 mPa·s, and a similar surface tension. It could be further surprisingly observed that sample S1 had a contact angle of 7.2 degrees, which is much lower than the contact angle obtained for comparable sample C1 with 19.70 degrees. A low contact angle is a desired property of a resist composition, because with decreasing contact angle the drop spreading is increasing, which can again increase the throughput during IAP processing.

The viscosities of the samples were measured at 23° C., using a Brookfield Viscometer LVDV-II+Pro at 200 rpm, with a spindle size #18. For the viscosity testing, about 6-7 mL of sample liquid was added into the sample chamber, enough to cover the spindle head. For all viscosity testing, at least three measurements were conducted and an average value was calculated.

The contact angle and surface tension were measured with a Drop Master DM-701 contact angle meter made by Kyowa Interface Science Co. Ltd. (Japan). For the testing, 2 ml of the test sample was added to the syringe, of which 2 µl sample per test was added by the machine to the surface of a quartz ($SiO_2$) slide to mimic the contact surface of a template. Drop images were continuously captured by a CCD camera from the time the resist sample drop touched the primed quartz surface. The contact angle was automatically calculated by the software based on the analysis of the images. The data presented in Table 3 are the contact angles at a time of 3 seconds after touching the primed quartz, surface. The DM701 further calculated the surface tension based on images of drops hanging on the syringe needle and using the Young Laplace theory.

Example 5

Dry Etch Testing of Photo-Cured Layers

Photo-cured layers of each photo-curable composition S1, C1, S2, and C2 were made by applying a 100 nm thick liquid film of the photocurable composition on a quartz substrate and exposing the liquid films to UV radiation until they were solid and fully cured. The liquid films were cured by subjecting the films to a UV light intensity of 20 mW/cm² for 120 seconds, which corresponded to a curing energy dosage of 2.4 J/cm².

The etch resistance of the photo-cured layers was tested according to three different etching processes: 1) $Cl_2/O_2$ etching, 2) $O_2/Ar$ etching, and 3) $CF_4/Ar$ etching.

For testing the etch resistance, a plurality of films from Sample 2 and Comparative Sample C2 were placed on the same wafer in a checker-board pattern, such that the films of the two samples were placed in alternating order. Each checker board contained six films of each tested sample. Similarly, another checker board was created with Sample S1 and Comparative Sample C2, and one checker board with Comparative Sample C1 and Comparative Sample C2.

After the above described curing of the sample films, the checker-board was placed in a Trion Oracle 3-Chamber Cluster System to expose the films to the selected dry etch conditions. The Trion Oracle 3-Chamber Cluster System is a dry etch tool having three separate process chambers, each chamber being connected to a central load-lock chamber containing access to the gases $Cl_2$, $O_2$, $CF_4$, and argon.

The $Cl_2/O_2$ etching was conducted under the following conditions: $Cl_2$=54 sccm, $O_2$=9 sccm, RIE (reactive ion etching)=90 w, P (pressure)=150 mt, ET (etching time)=90 s.

The $O_2/Ar$ etching was conducted as following: $O_2$=2 sccm, Ar=10 sccm, RIE=45 w, P=10 mt, ET=45 s.

The $CF_4/Ar$ etching was conducted as following: $CF_4$=5 sccm, Ar=30 sccm, RIE 75 w, P=120 mt, ET (etching time)=60 s.

The results of the etching experiments are summarized in Table 3, which show the actually measured amounts of removed material, expressed as etch depth in nm, and normalized values. For calculating the normalized values, the actually measured etch-rate of comparative sample C2 was set to 1, and the corresponding normalized etch rates of the other samples was calculated based thereon. It can be seen that samples S1 and S2, which contained 10 wt % of CN-TCMA or CN-BZA, respectively, had a higher etch resistance (corresponding to a lower etch depth) in comparison to comparative samples C1 and C2 under $O_2/Ar$ etching conditions and during $Cl_2/O_2$ etching. When etching with $CF_4/Ar$, sample S2 had the highest etch resistance, and sample S1 was close to comparative sample C1.

TABLE 3

| Sample | CN-Acrylate Monomer | Average Etch Depth [nm] | | | Normalized Etch Rate* | | |
|---|---|---|---|---|---|---|---|
| | | $O_2/Ar$ | $Cl_2/O_2$ | $CF_4/Ar$ | $O_2/Ar$ | $Cl_2/O_2$ | $CF_4/Ar$ |
| S1 | 10 wt % CN-TCMA | 49.0 | 30.2 | 43.9 | 0.940 | 0.993 | 1.012 |
| C1 | — | 52.2 | 31.3 | 45.2 | 1.028 | 1.021 | 1.040 |
| S2 | 10 wt % CN-BZA | 49.0 | 29 | 42.5 | 0.942 | 0.951 | 0.966 |
| C2 | — | 52.0 | 30.5 | 44.0 | 1 | 1 | 1 |

*normalized to sample C2

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a polymerizable material and a photoinitiator, wherein
   the polymerizable material comprises at least one acrylate monomer including at least one cyano group (CN-acrylate monomer);
   an amount of the CN-acrylate monomer is at least 5 wt % and not greater than 30 wt % based on the total weight of the polymerizable material; and
   a contact angle of the photocurable composition to a $SiO_2$ surface is not greater than 19.5 degrees,
   and wherein the CN-acrylate monomer includes a monomer of formula (1), with R1 being H or one ore more alkyl substitutions, and R2 being H or alkyl

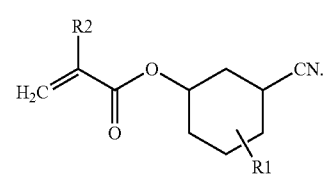

(1)

2. The photocurable composition of claim 1, wherein the contact angle is not greater than 15.0 degrees.

3. The photocurable composition of claim 2, wherein the contact angle is not greater than 10.0 degrees.

4. The photocurable composition of claim 1, wherein the CN-acrylate monomer includes the monomer of formula (2)

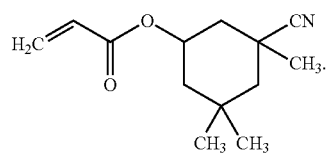

(2)

5. The photocurable composition of claim 1, wherein the CN acrylate monomer includes 3-cyano benzyl acrylate or 3-cyano benzyl methacrylate.

6. The photocurable composition of claim 1, wherein the amount of the CN-acrylate monomer is not greater than 20 wt % based on the total weight of the polymerizable material.

7. The photocurable composition of claim 6, wherein the amount of the CN-acrylate is not greater than 15 wt % based on the total weight of the polymerizable material.

8. The photocurable composition of claim 1, wherein the polymerizable material further comprises at least one multi-functional acrylate monomer not including a cyano group.

9. The photocurable composition of claim 8, wherein the multi-functional acrylate monomer is a bi-functional acrylate monomer.

10. The photocurable composition of claim 8, wherein an amount of the multi-functional acrylate monomer is at least 10 wt % and not greater than 50 wt % based on the total weight of the polymerizable material.

11. The photocurable composition of claim 9, wherein the polymerizable material further comprises at least two mono-functional acrylate monomers not including a cyano group.

12. The photocurable composition of claim 1, wherein a viscosity of the photocurable composition is not greater than 15 mPa·s at a temperature of 23° C.

13. A laminate comprising a substrate and a photo-cured layer overlying the substrate, wherein the photo-cured layer is formed from the photocurable composition of claim 1.

14. A method of forming a photo-cured layer on a substrate, comprising:
applying a layer of a photocurable composition on the substrate, the photocurable composition comprises a polymerizable material and a photoinitiator, wherein the polymerizable material comprises at least one acrylate monomer including at least one cyano group (CN-acrylate monomer), an amount of the CN-acrylate monomer is at least 5 wt % and not greater than 30 wt %; and a contact angle of the photocurable composition to a SiO$_2$ surface is not greater than 19.5 degrees;
bringing the photocurable composition into contact with a superstrate;
irradiating the photocurable composition with light to form a photo-cured layer; and
removing the superstrate from the photo-cured layer,
wherein the CN acrylate monomer includes a CN acrylate monomer of formula (1), with R1 being one ore more alkyl substitutions and R2 being H or alkyl,

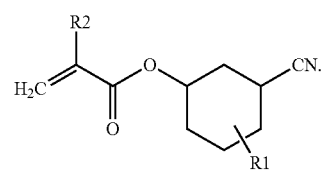

(1)

15. The method of claim 14, wherein a viscosity of the photocurable composition is not greater than 15 mPa·s at a temperature of 23° C.

16. The method of claim 14, wherein the polymerizable material of the photocurable composition further comprises a bi-functional acrylate monomer in an amount of at least 10 wt % and not greater than 30 wt % based on the total weight of the polymerizable material.

17. A method of manufacturing an article, comprising:
applying a layer of a photocurable composition on a substrate, wherein the photocurable composition comprises a polymerizable material and a photoinitiator, the polymerizable material comprising at least one acrylate monomer including at least one cyano group (CN-acrylate monomer), an amount of the CN-acrylate monomer is at least 5 wt % and not greater than 30 wt %, and a contact angle of the photocurable composition to a SiO$_2$ surface is not greater than 19.5 degrees;
bringing the photocurable composition into contact with a superstrate;
irradiating the photocurable composition with light to form a photo-cured layer;
removing the superstrate from the photo-cured layer;
forming a pattern on the substrate;
processing the substrate on which the pattern has been formed in the forming; and
manufacturing an article from the substrate processed in the processing,
wherein the CN acrylate monomer includes a CN acrylate monomer of formula (1), with R1 being H or one ore more alkyl substitutions and R2 being H or alkyl,

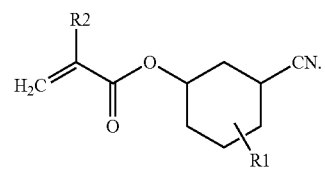

(1)

* * * * *